United States Patent [19]
Son et al.

[11] 3,732,286
[45] May 8, 1973

[54] COMPOSITIONS COMPRISING AN EPOXY RESIN, DICYANIAMIDE AND AN ACYLGUANIDINE

[75] Inventors: Pyong-Nae Son, Akron; Carl D. Weber, Copley, both of Ohio

[73] Assignee: The B. F. Goodrich Company, New York, N.Y.

[22] Filed: Nov. 1, 1971

[21] Appl. No.: 194,524

[52] U.S. Cl...........260/47 EN, 117/161 ZB, 260/2 N, 260/28, 260/30.4 EP, 260/31.4 EP, 260/37 EP, 260/78.4 EP
[51] Int. Cl. ..............................................C08g 30/14
[58] Field of Search....................260/47 EN, 2 N, 59, 260/78.4 EP, 18 EP

[56] References Cited

UNITED STATES PATENTS

| | | | |
|---|---|---|---|
| 3,397,156 | 8/1968 | Lopez et al. | 260/47 X |
| 3,391,113 | 7/1968 | Lopez et al. | 260/47 |

*Primary Examiner*—William H. Short
*Assistant Examiner*—T. Pertilla
*Attorney*—Albert C. Doxsey et al.

[57] ABSTRACT

Mixtures storable at room temperature for periods up to 30 days, yet which cure quickly at moderately elevated temperatures and are suitable for the manufacture of shaped structures, coatings and adhesive bonds, have been prepared comprising an epoxy resin, dicyaniamide as a curing agent, and an acylguanidine as an accelerator for the cure.

5 Claims, No Drawings

COMPOSITIONS COMPRISING AN EPOXY RESIN, DICYANIAMIDE AND AN ACYLGUANIDINE

BACKGROUND OF THE INVENTION

Epoxy resins have been cured with dicyandiamide and similar materials at elevated temperatures to form insoluble, crosslinked, high molecular weight products. The cured products have good chemical and mechanical properties including excellent adhesion to metals and many other materials. Mixtures of epoxy resins and dicyandiamide store well at room temperature and are useful in molding compositions.

An amount of from 3 to 15 parts of curing agent per 100 parts resin is generally capable of crosslinking epoxy resins at a temperature of 175° C. – 250° C. in about 45 to 60'. A preferred curing agent is cyanoguanidine (dicyandiamide). This material is representative of useful curing agents of the class which is represented by the formula:

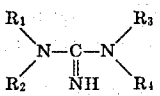

wherein $R_1$, $R_2$, $R_3$ and $R_4$ are the same or different and are selected from the group consisting of hydrogen, cyano, $C_1$ to $C_3$ alkyl groups, and $C_1$ to $C_3$ hydroxyalkyl groups. The corresponding bis compounds, such as biguanide ($NH_2$ — CNH — NH — CNH — $NH_2$) and heptamethylisobisguanide may also be used.

For many applications the epoxy resin systems cured with dicyandiamide alone have undesirably long curing times at relatively high temperatures and it would be useful to have epoxy resin compositions that will store well at room temperature, yet cure readily to a thermoset condition at relatively low temperatures in a short period of time, for example, in less than 60 minutes at 120° C. or in less than 30 minutes at 150° C. High temperature cures are undesirable because of the expense involved in obtaining them. In addition the high temperatures often cause yellowing in certain stocks and may otherwise adversely affect properties of one or more parts of a composition being cured.

Conventional accelerator additives for cure of epoxy resins include polycarboxylic acid anhydrides. These cure systems are also known to be accelerated by the addition of tertiary amines. When tertiary amines are employed to accelerate a dicyandiamide cure of epoxy resin, only minor improvement is obtained. If the amount of tertiary amine accelerator is increased sufficiently to satisfactorily accelerate the dicyandiamide cure, storage properties of the composition are found to be impaired.

Dicyandiamide is an effective curing agent for epoxy resins and combinations of epoxy resin and dicyandiamide have good room temperature aging characteristics. It is desirable to find an additive for the epoxy resin-dicyandiamide cure system that will not significantly detract from the room temperature storability of the composition, yet will accelerate the final cure so that shorter times, in the range 10 to 30', and/or lower temperatures, in the range 100° – 150° C., can be employed to accomplish the cure.

SUMMARY OF THE INVENTION

It has been discovered that 1,1,3,3-tetraalkyl-2-acylguanidines have high activity as accelerators for cure of epoxy resins with dicyandiamide. In the ranges in which they act as accelerators for cure of epoxy resin with dicyandiamide, many of these substituted guanidines have little or no adverse effect on the storability of epoxy resin-dicyandiamide mixtures or on the properties of the cured products. Stability varies somewhat depending upon the type and concentration of substituted guanidine used. The mixtures can be stored at room temperature for up to about 30 days.

This invention provides storable mixtures which cure quickly at moderately elevated temperatures and are suitable for the manufacture of shaped structures, coatings and adhesive bonds. The compositions are especially useful in the forms of powdered or granulated materials containing a) a polyepoxy compound whose molecule contains an average of more than one epoxide group, b) dicyandiamide as a curing agent and c) as a curing accelerator a 2-acyl substituted guanidine of the formula

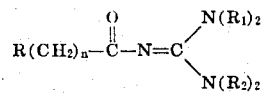

in which R represents an aromatic group of six to 10 carbon atoms, hydrogen, or an alkyl group of one to four carbon atoms. When R is an aromatic group, said group may bear substitution such as chloro or nitro in the o-, m-, or p- position. The terms $R_1$ and $R_2$ are alkyl groups of one to five carbon atoms. They may be the same or different, but, preferably are both methyl.

The term n is a number from 1 to 15. The 2-acyl substituted guanidines of this invention are readily prepared by the reaction of acyl chlorides or alkanesulfonyl chlorides with tetraalkylguanidine in the presence of a tertiary amine catalyst such as triethylamine. Tetraalkylguanidines such as tetramethylguanidine are commercially available.

An advantage of these 2-acyl substituted guanidines as accelerators for dicyandiamide cure of epoxy resins is that they disperse readily and homogenously into a mixture of epoxy resin and dicyandiamide. The effect of these accelerators is evident when they are employed in an amount as low as 0.05 part by weight per 100 parts of epoxy resin. As high as 10 parts accelerator can be employed. More than this amount of accelerator leads to a dropoff in room temperature storage life of the mixtures. The preferred range of accelerator is 0.1 to 2.0 parts per 100 parts epoxy resin. The preferred range of curing agent (preferably dicyandiamide) employed in this process is 5 to 15 parts per 100 parts of epoxy resin.

The term "polyepoxide resin" as used herein describes the polymeric reaction products of polyfunctional halohydrins such as epihalohydrins with polyfunctional hydrogen-donating reactants, or their salts, such as polyfunctional phenols, alcohols, amines, acids and their salts. The major reaction is presumably a splitting out of hydrogen or metal halie with simultaneous opening and reaction of the epoxy ring. The resin molecule would then contain functional hydroxy side groups, 1.2 epoxy end groups, and ethereal or ester linkages. A small proportion of hydroxy end groups are also likely to be present. Other terms often used synonomously with "polyepoxide resin" are "polymeric glycidyl ethers" and "epoxy-hydroxy polyether resins." The term "polyepoxide resin" as used herein is also intended to include glycidyl polyesters as well as glycidyl polyethers. The important common properties are the resinous character and the functional 1.2 epoxy and hydroxy groups. Polyepoxide resins are also preparable from epoxy containing compounds having a non-halide, hydrogen bonding reaction group.

A typical method of preparing a polyepoxide resin is described in U.S. Pat. No. 2,500,449 in which epichlorohydrin is reacted with bisphenol at 100° C. in the presence of sufficient alkali to bind the hydrochloric acid formed. The resins formed vary according to the molar proportions and reaction conditions, and have melting points ranging from 43° to 112° C. In this particular case the end groups are presumed to be epoxy groups while there are many intermediate functional hydroxy groups. Further hardening of a typical polyepoxide resin such as this is provided by heating with a hardening agent, usually bi-functional, which acts to cross-link the previously formed resin, e.g. oxalic acid, citric acid, inorganic bases, organic bases etc. Other polyepoxide resins and methods are described in U. S. Pat. Nos. 2,444,333; 2,528,932; 2,500,600; 2,467,171 and others.

Polyepoxide resins are available commercially in a wide range of epoxy content, molecular weight, softening point and composition. Epoxy resins, containing an average of at least one epoxide group per molecule unit in the formula, include polymers produced by condensation of epichlorohydrin with bisphenol A, alicyclic polyepoxides such as epoxyethyl-3,4-epoxycyclohexane (vinylcyclohexene diepoxide), dicyclopentadiene diepoxide, 3,9-bis(3',4'-epoxycyclohexyl)-spirobi (meta-dioxane); di- or polyglycidyl ethers of polyhydric alcohols such as 1,4 butanediol or of polyglycols such as polypropylene glycols; di- or polyglycidyl ethers of polyhydric phenols such as resorcinol, bis(p-hydroxyphenyl) methane, 2,2-bis(p-hydroxyphenyl) propane, 1,1,2,2-tetrakis (p-hydroxyphenyl) ethane; condensed products of phenols reacted with formaldehyde under acid conditions such as phenol-novolaks, and the like.

These mixtures of epoxy resin, dicyandiamide and 2-acylguanidines are readily cured at 100° C to 150° C in from 2 to 30 minutes with 10 to 30 minutes being preferred. When the cure is extremely rapid at the lower temperatures, the compositions often are difficult to handle and process successfully.

The term "curing" as used herein means the conversion of soluble liquid or fusible polyepoxide into solid, infusible, insoluble three dimensionally crosslinked material. The cure may be accompanied by casting, molding or other shaping technique. Coatings and adhesives in the form of films may be formed before the cure is completed.

The curable mixtures of this invention may further contain plasticizers such as dioctyl phthalate, inert solvents such as styrene oxide, extenders, fillers or reinforcing agents. Typical of the latter materials that can be employed are bitumen, textile fiber glass fibers, mica, titanium dioxide, kaolin, carbon black and various dyestuffs.

The curable epoxy resin, curing agent, accelerator mixtures of this invention are evaluated by a test for measuring gel time by the following internal testing method:

Resin, curing agent, and accelerator are mixed in a test tube and stirred while being heated to the selected reaction temperature in a constant temperature bath. Once triggered, the reaction is exothermic and produces a peak exotherm higher than the bath temperature. Test batches total about 5 grams of material. A thermocouple probe, connected to a temperature recorder, is inserted in the batch. The batch is stirred slightly every 30 seconds with the temperature probe. Time to reach reaction temperature and then the time to reach peak exotherm are indicated on the recorder chart. Actual solidification of the batch generally takes place just before the peak exotherm is recorded, but initial solidification is a condition that is difficult to determine visually. The time to raise the temperature from room temperature to the peak exotherm is therefore taken as the gel time of the sample batch.

DETAILED DESCRIPTION OF THE INVENTION

Preparation of 1,1,3,3-Tetramethyl Guanidine Derivatives 1,1,3,3-tetramethyl-2-benzoyl guanidine Tetramethyl guanidine (Eastman Kodak Co.), 57.6 g. (0.5 mole), and 50.6 g. (0.5 mole) triethylamine dissolved in 400 ml tetrahydrofuran are placed in a dry 2 liter flask. The solution is cooled to 9° C. and 70.3 g. (0.5 mole) of benzoyl chloride in 200 ml. tetrahydrofuran is added dropwise. A white precipitate of triethyl ammonium chloride forms. Temperature is maintained at 9° – 18° C. The slurry is stirred two hours, then filtered. The precipitate is washed with tetrahydrofuran and the combined washings and filtrate are concentrated on a rotary evaporator to form a yellow syrup in the amount of 110 g. (86 percent of theory).

The yellow syrup analyzes as 1,1,3,3-tetramethyl-2-benzoyl guanidine by elemental analysis, infrared, mass spectroscopy and nuclear magnetic resonance (NMR).

Analysis: calculated for $C_{12} H_{17} N_3 O$, C, 65.72; H, 7.82; N, 19.17. Found C, 65.36; H, 7.77; N, 19.49.

Using the same procedure and varying the acyl chloride as shown in Table 1 below gives the substituted tetramethyl guanidines listed in Table 1.

TABLE 1

| (Acyl) chloride | 1,1,3,3-tetramethyl guanidine | Designation |
|---|---|---|
| Benzoyl chloride | 1,1,3,3,-tetramethyl-2-benzoyl quanidine | A |
| Acetyl chloride | 1,1,3,3-tetramethyl-2-acetyl guanidine | B |
| p-Nitrobenzoyl chloride | 1,1,3,3-tetramethyl-2-(p-nitrobenzoyl guanidine | C |
| p-Chlorobenzoyl chloride | 1,1,3,3-tetramethyl 2-(p-chlorobenzoyl guanidine | D |
| Methane sulfonyl chloride | 1,1,3,3-tetramethyl-2-methane sulfonyl guanidine | E |
| Phenylmethane | 1,1,3,3-tetramethyl- | |

| sulfonyl chloride | 2-phenylmethane sulfonyl guanidine | F |

EXAMPLE 1

An epoxy resin of diglycidyl ether of bisphenol A and epichlorohydrin having an avg. mol. wt. of 360–390 (Epon 828) is cured with dicyandiamide and 1,1,3,3-tetramethyl-2-acetyl guanidine (B) by mixing the ingredients in the proportions shown below and heating in a constant temperature bath gel test described above.

TABLE 2

| Material | Parts by weight |
|---|---|
| Epoxy resin | 100 |
| Dicyandiamide | 12 |
| 1,1,3,3-tetramethyl-2-acetyl guanidine | 4 |
| Temp. of Gelation | Time of Gel |
| 100°C | 29 min. |
| 120°C | 8 min. 10 sec. |

At 100° C the accelerated system of the invention cures in 29 minutes. With only curing agent, dicyandiamide, added to the resin, gelation does not occur at all at 100° C. When the curing temperature is increased slightly to 120° C (much below the 175° or higher temperature which is needed to cure the resin plus dicyandiamide alone in about 30') the gel time is reduced by about ⅔ to a bit over 8 minutes.

EXAMPLE 2

The 2-acyl substituted guanidines prepared and identified above are evaluated in the gel test procedure at a bath temperature of 121° C. The test sample contains 100 parts Epon 828 resin, 12 parts dicyandiamide and 4 parts accelerator. With each accelerator material, a control is run omitting the dicyandiamide to determine if the acyl substituted guanidine contributes anything directly to a system cure.

TABLE 3

| Accelerator Designation | Peak Exo Therm °C | Dicyandiamide plus accelerator-gel time | | Accelerator alone-gel time |
|---|---|---|---|---|
| A | 157 | 30' | 30" | >120' |
| B | 197 | 10' | 30" | >60' |
| C | 122 | 30' | | >120' |
| D | 133 | 36' | 37" | >120' |
| Tetramethyl guanidine | 207 | 5' | 20" | 35' |

When the accelerator employed is 4 parts methane sulfonyl chloride and 4 parts phenylmethanesulfonyl chloride, equivalent cure results are obtained.

The materials of the invention do not contribute significantly to cure unless dicyandiamide is present as the curative. The accelerators enable one to cure an epoxy resin-dicyandiamide appreciably faster and at an appreciably lower temperature than when the accelerators are absent. Tetramethyl guanidine, the parent compound of the 2-acyl-tetramethylguanidines, gives too fast a cure. The products of too fast cure tend to be poor in adhesion and processing of the adhesive composition is difficult.

EXAMPLE 3

Epoxy resin, (100 parts) dicyandiamide (12 parts) and a range of accelerator are evaluated in the gel test procedure at 121° C bath temperatures with these results:

TABLE 4

| 2-Acetyl-1,1,3,3-tetramethyl guanidine - parts | 1 | 2.6 | 5 |
|---|---|---|---|
| Time to gel - minutes | 15' | 10'25" | 7'30" |
| Peak Exotherm (°C) | 190 | 195 | 198 |

We claim:

1. A curable composition consisting of 100 parts polyepoxide resin containing an average of more than one 1.2-epoxide group per molecule, from 3 to 15 parts by weight of dicyandiamide curing agent, and from 0.05 to 10.0 parts by weight of a curing accelerator of the formula

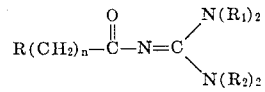

in which R represents an aromatic group of six to 10 carbon atoms, hydrogen, or an alkyl group of one to four carbon atoms, $R_1$ and $R_2$ are alkyl groups of one to five carbon atoms and may be the same or different, n is a number from 1 to 15 said composition being characterized by the ability to cure in 8' to 30' when heated to 100°–150° C.

2. A composition as claimed in claim 1 in which the said accelerator is 1,1,3,3-tetramethyl-2-benzoyl guanidine.

3. A composition as claimed in claim 1 in which the said accelerator is 1,1,3,3-tetramethyl-2-acetyl guanidine.

4. A composition as claimed in claim 1 in which the said accelerator is 1,1,3,3-tetramethyl-2-(p-nitrobenzoyl) guanidine.

5. A composition as claimed in claim 1 in which the said accelerator is 1,1,3,3-tetramethyl-2-(p-chlorobenzoyl)guanidine.

* * * * *